(12) United States Patent
Denz et al.

(10) Patent No.: US 11,121,652 B2
(45) Date of Patent: Sep. 14, 2021

(54) DETERMINATION OF AN INTERRUPTED MOTOR PHASE OF AN ELECTRIC MOTOR

(71) Applicant: Robert Bosch GmbH, Stuttgart (DE)

(72) Inventors: Dominik Denz, Buehl (DE); Haithem Fkaier, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 16/724,736

(22) Filed: Dec. 23, 2019

(65) Prior Publication Data

US 2020/0212828 A1 Jul. 2, 2020

(30) Foreign Application Priority Data

Dec. 27, 2018 (DE) ..................... 10 2018 251 703.7
Jan. 18, 2019 (DE) ..................... 10 2019 200 609.4

(51) Int. Cl.
*H02K 29/06* (2006.01)
*H02P 6/18* (2016.01)
*H02P 29/024* (2016.01)
*H02P 8/36* (2006.01)

(52) U.S. Cl.
CPC ............... *H02P 6/186* (2013.01); *H02P 8/36* (2013.01); *H02P 29/025* (2013.01); *H02P 29/0241* (2016.02)

(58) Field of Classification Search
CPC ........ H02P 6/186; H02P 29/0241; H02P 8/36; H02P 29/025
See application file for complete search history.

(56) References Cited

U.S. PATENT DOCUMENTS

2014/0321001 A1* 10/2014 Yoshiya ................. G11B 19/26
360/99.08

FOREIGN PATENT DOCUMENTS

DE          10100159 A1    1/2001
DE       102011083217 A1   3/2013

* cited by examiner

*Primary Examiner* — Karen Masih
(74) *Attorney, Agent, or Firm* — Michael Best & Friedrich LLP

(57) ABSTRACT

A method for determining an interrupted motor phase of an electric motor having at least three windings by means of a control unit is disclosed, wherein voltages induced in the windings are determined on outer conductors of the electric motor by means of at least one measuring unit, wherein the measuring unit is connected to at least one outer conductor of the electric motor via at least one resistor, the induced voltages of the outer conductors of the electric motor are compared with one another, and an interrupted motor phase is registered if the induced voltage differs or if a frequency of the induced voltage differs. A control unit, a computer program and a machine-readable storage medium are also disclosed.

11 Claims, 3 Drawing Sheets

D1

100ms

D1

100ms

D2

100ms

DETERMINATION OF AN INTERRUPTED MOTOR PHASE OF AN ELECTRIC MOTOR

BACKGROUND OF THE INVENTION

The invention relates to a method for determining an interrupted motor phase of an electric motor having at least three windings, to a control unit, to a computer program and to a machine-readable storage medium.

Internal combustion engines are usually used as drive motors in vehicles. The internal combustion engines can be in the form of gasoline engines or diesel engines, for example. As a result of the combustion of the fuel, thermal energy is produced during operation of the internal combustion engine and is dissipated from the engine block via a cooling circuit. The cooling circuit is guided through a heat sink or a radiator which is actively cooled by means of at least one fan. Fans are also used in other vehicles, for example electric vehicles and hybrid vehicles, for example to cool batteries and power electronics.

Such a fan is driven, for example, by an electric motor having a three-phase design. As a result of a fault, one of the phases of the electric motor may be interrupted or decoupled from the motor controller. However, an interruption of a phase may result in an unnecessarily high phase current in the other phases or windings of the electric motor.

SUMMARY OF THE INVENTION

The object on which the invention is based can be considered that of proposing a method and a control unit for avoiding excessive phase currents in electric motors.

This object is achieved by means of the respective subject matter of the independent claims. Respective dependent subclaims relate to advantageous configurations of the invention.

One aspect of the invention provides a method for determining an interrupted motor phase of an electric motor. In particular, the method can be carried out by a control unit or with the aid of the control unit. The electric motor has at least three windings which may be in the form of phases of the electric motor.

Each phase is preferably connected to a half-bridge. An outer conductor can be defined as a connection between the motor and an output stage. The motor can be operated by means of a star circuit or a delta circuit.

In one step, voltages induced in the windings are determined on outer conductors of the electric motor by means of at least one measuring unit. The at least one measuring unit is connected to at least one outer conductor of the electric motor via at least one resistor. For example, a measuring unit can measure the voltages induced in phases and can compare them with one another. Alternatively or additionally, a plurality of measuring units for determining induced voltages can be provided.

The induced voltages of the outer conductors of the electric motor are then compared with one another. An interrupted motor phase is registered if the induced voltage differs or if a frequency of the induced voltage differs.

A further aspect of the invention provides a control unit, wherein the control unit is configured to carry out all steps of the method according to the invention.

In addition, one aspect of the invention provides a computer program comprising instructions which, when the computer program is executed by a computer or a control unit, cause the latter to carry out the method according to the invention.

A further aspect of the invention provides a machine-readable storage medium on which the computer program according to the invention is stored.

An interrupted motor phase may be present if at least one motor phase is not connected to the power output stage or is faulty. This may be the case, for example, in the event of a cable break, a damaged solder joint or contact point, a short circuit in the windings and the like.

In this case, the induced voltage can be monitored without additional sensors. The outer conductors already connected to the electric motor can be used in the motor controller to measure the induced voltages. The voltages can preferably be measured in the respective phases or outer conductors while the latter are briefly deenergized or do not have a voltage applied to them. As a result, the frequencies and/or the level of the induced voltages in the windings of the electric motor can be monitored in parallel with operation of the electric motor. It is therefore possible to avoid an unnecessarily high phase current during operation of the electric motor.

An interrupted phase can be detected, for example, when no induced voltage can be measured in an outer conductor. Furthermore, an increased frequency or a frequency of the resulting induced voltage pulses which differs from a reference can be measured on account of a disconnected phase. For example, the frequency of the induced voltage pulses can be doubled relative to a reference frequency in the event of an interrupted phase of the electric motor.

The induced voltages can preferably be in the form of a so-called back electro-motive force (BEMF).

The electric motor may be, for example, a multi-phase electric motor which can be operated in a delta circuit. The respective outer conductors or phases can be connected to a comparator of a motor controller via resistors. The outer conductors are preferably connected here to the motor contacts for supplying the electric motor with electrical energy. The comparison signals from the comparator can therefore be generated or measured at the, for example three, motor contacts by a resistance circuit.

The comparators used can add operating voltages of two phases to one another, for example, and can compare them with a doubled third phase. If the two signals intersect, a trigger or an output can be effected by the comparator. The already existing connection to the phases of the electric motor can therefore be additionally used for the monitoring. In this case, the periods in which the phases are not fed can preferably be used to measure the induced voltages.

The method and the control unit can be used, for example, in all three-phase systems, for example electric motors or generators and/or in so-called B6 topologies.

According to one embodiment, the electric motor is at least temporarily deactivated or is operated with a reduced current if an interrupted motor phase is determined. Determining an interrupted phase makes it possible to carry out measures to prevent damage. This can be implemented, for example, by coupling the measurement of the induced voltages to the motor controller. In particular, this makes it possible to implement self-protection for the electric motor, which avoids overheating or overloading. In this case, there is a minimum need to change the existing components for operating the electric motor since no additional components are required.

According to a further embodiment, the control unit is in the form of at least one BEMF comparator or in the form of an electric motor controller with at least one BEMF comparator. The induced voltage is measured in the form of a signal from the BEMF comparator. The determined signals of the outer conductors are compared with one another. This makes it possible to integrate or implement the method directly in an electric motor controller without the need for additional sensors or electronic connections. The at least one BEMF comparator can preferably be connected to a phase or outer conductor of the electric motor via at least one resistor in order to carry out a voltage measurement.

The BEMF comparator can preferably be in the form of a dBEMF (digital back electromotive force) comparator. In the case of a three-phase electric motor, it is therefore possible to provide three comparators which are each configured to measure the induced voltages and to determine a zero crossing, for example.

According to a further embodiment, an interrupted motor phase is determined if the frequency of the induced voltage is at least doubled in comparison with a reference frequency on at least one outer conductor. In the comparators used, a reference frequency can be formed by an average of the operating frequencies of the respective phases. If one phase is omitted, the frequency measured by the comparators is distorted, with the result that a difference arises between the measured frequency of the induced voltage in the respective phase and the reference frequency.

According to a further embodiment, an interrupted motor phase is determined if the frequency of the induced voltage differs from the reference frequency on at least one outer conductor. As a result, determined discrepancies can already be used to determine a fault and to output a warning or a signal, for example, in order to test the functionality of the electric motor.

According to a further exemplary embodiment, an interrupted motor phase is determined if no induced voltage can be measured on at least one outer conductor. If no signals or no induced voltage is/are measured on at least one phase, a clear interruption of a phase can be detected.

During regular operation of the electric motor, all phases or the induced voltages of all phases are substantially the same and have the same frequency.

According to a further exemplary embodiment, the electric motor is in the form of an electric motor of an engine cooling system. As a result, the drive motor of the engine cooling system can be monitored for proper functionality by the control unit or the electric motor controller. No further components may be necessary for this purpose. The electric motor controller can preferably be reprogrammed and/or slightly adapted for this purpose.

According to a further exemplary embodiment, the control unit is in the form of a comparator or in the form of a measuring unit of an electric motor controller. An electrical connection which has already been established between the phases of the electric motor and the respective comparators can therefore be used to monitor the electric motor.

According to a further exemplary embodiment, the control unit is in the form of a comparator or in the form of a measuring unit of a pulse width modulator. Alternatively, the control unit may be in the form of a speed controller of the electric motor. In particular, the pulse width modulator may be separate or may be integrated in the electric motor controller.

BRIEF DESCRIPTION OF THE DRAWINGS

Preferred exemplary embodiments of the invention are explained in more detail below on the basis of highly simplified schematic illustrations, in which.

DETAILED DESCRIPTION

Figure 1:
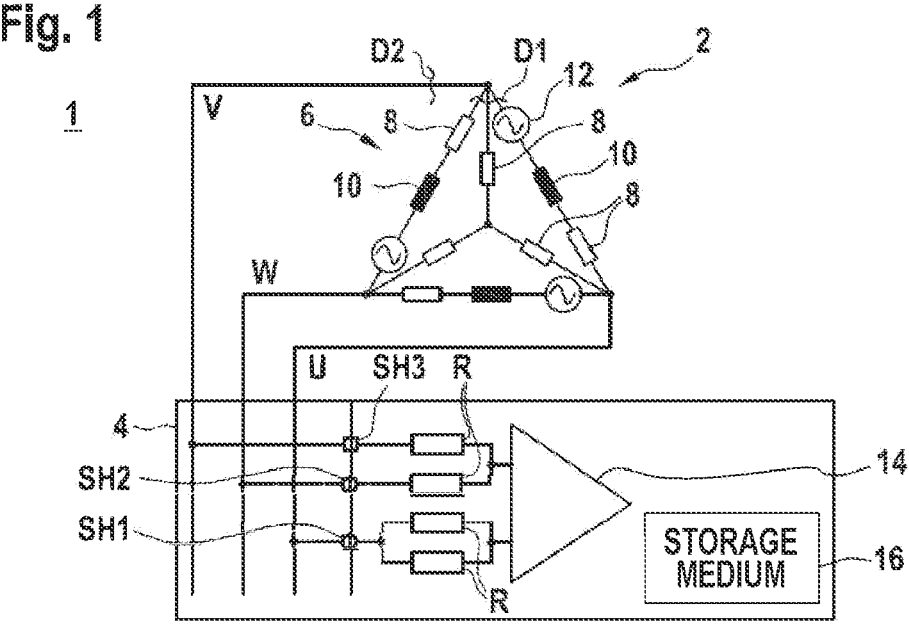
FIG. 1 shows a schematic circuit diagram of an arrangement having an electric motor and a connected control unit according to one embodiment.

FIG. 1 illustrates a schematic circuit diagram of an arrangement 1 having an electric motor 2 and a connected control unit 4 according to one embodiment.

In particular, the circuit diagram is used to illustrate a method for determining an interrupted motor phase U, V, W of the electric motor 2 having three windings 6 by means of the control unit 4.

An equivalent circuit diagram for the electric motor 2 is illustrated. Each winding 6 can be described here as a combination of a resistor 8 and an inductance 10. The respective voltage sources 12 (BEMF) in the windings 6 are likewise illustrated in the form of a sinusoidal profile for the sake of completeness.

The outer conductors U, V, W or the motor phases are not represented in the control unit 4 by circuit breakers. The control unit 4 is implemented at least once and electrically connects the respective outer conductors U, V, W to the comparator 14 via connection points SH1, SH2, SH3. One control unit 4 is illustrated for the sake of simplicity. The induced voltages on the outer conductors U, V, W are measured and are compared with one another. In particular, in the comparator 14 illustrated, the induced voltages of the outer conductors V and W are added to one another and are compared with a doubly induced voltage of the outer conductor U. The voltages are added or doubled by means of the resistors R which are used and are identical.

The control unit 4 has three comparators 14 which compare the respective phases U, V, W with one another in an alternating sequence. In particular, the following comparisons can be carried out:

U+V with 2*W
V+W with 2*U
U+W with 2*V

In this case, the voltages induced in the outer conductors U, V, W, in particular, can be measured and compared with one another. The resistors R are used to measure the induced voltages.

An interrupted motor phase U, V, W is determined if the induced voltage differs or if a frequency of the induced voltage differs.

D1 and D2 show, by way of example, possible interruptions of the motor phases U, V, W.

The control unit 4 may be in the form of a microcontroller, for example, which has a machine-readable storage medium 16 and is programmable.

Figure 2:
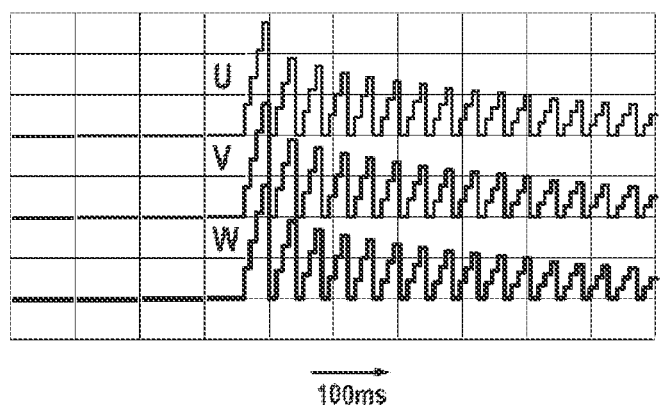
FIG. 2 shows a schematic graph with a detected edge change of the comparator within a measuring window.

FIG. 2 illustrates, in a schematic graph, detected edge changes of the comparator 14 within a measuring window during regular operation of the electric motor 2. All comparators 14 have virtually identical values and, in particular, identical frequencies of the determined induced voltages.

For a speed measurement, the pulses are counted four times in time slices of 100 ms each. The four levels shown in FIGS. 2 to 5 are each exemplary excerpts of a plurality of speed measurements which are strung together.

A speed measurement therefore consists of four exemplary levels here which have been determined by the control unit 4 or the comparators 14.

So that the functionality of the electric motor 2 is ensured, the pulses of the respective determined voltages U, V, W within a level must match one another. This is the case in FIG. 2, with the result that the electric motor 2 operates without faults.

Figure 3:
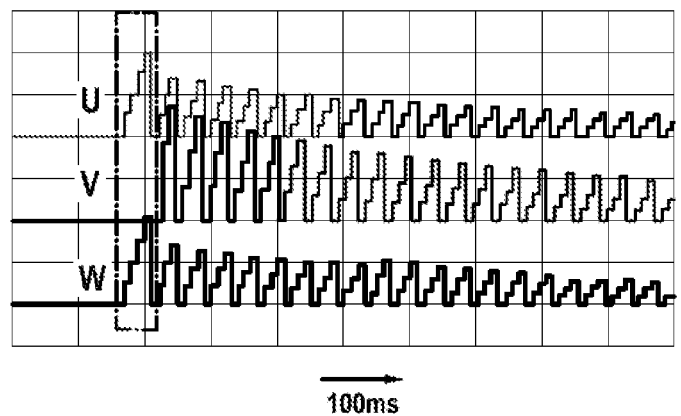
FIG. 3 shows a schematic graph with a detected edge change of the comparator within a measuring window in the event of a fault D1.
Figure 4:
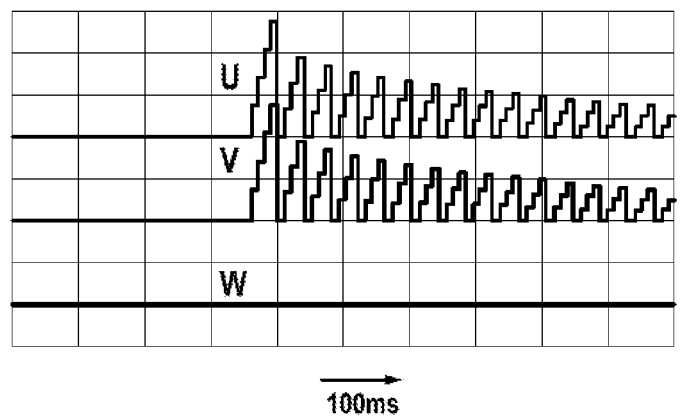
FIG. 4 shows a schematic graph with a detected edge change of the comparator within a measuring window in the event of an alternative fault D1.

FIG. 3 and FIG. 4 show pulse profiles of the speed determination in the event of a fault D1. In this case, two different scenarios may occur during the fault D1.

In a first scenario, if a phase V is disconnected during a start-up of the electric motor 2, the voltage or measured pulses can be omitted since no voltage can be induced on account of the interruption. Twice the voltage of the phase V is then induced. This is illustrated in FIG. 3.

In the second scenario which is illustrated by FIG. 4, no voltage is determined in the motor phase W or no voltage is induced in the phase W over the entire measuring interval.

Figure 5:
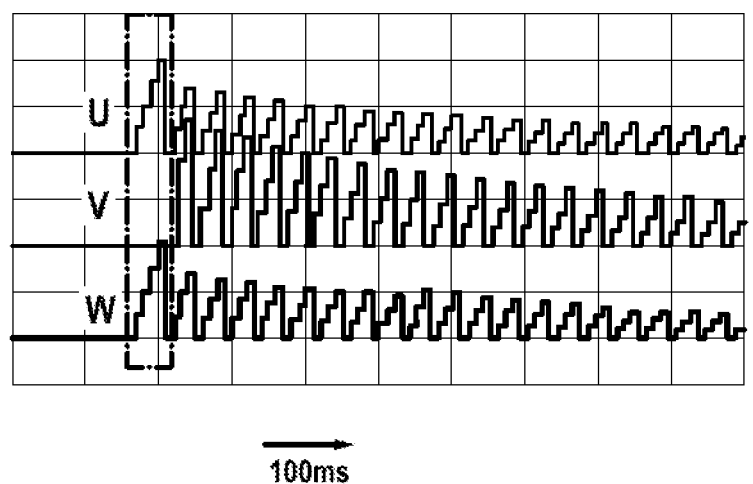
FIG. 5 shows a schematic graph with a detected edge change of the comparator within a measuring window in the event of a fault D2.

FIG. 5 shows a schematic graph with a detected edge change of the comparator within a measuring window in the event of a fault D2. In the event of the fault D2, the motor phase V is completely decoupled from the corresponding winding 6. In this case, a measurement result which is comparable to FIG. 3 is produced, in which no voltage can initially be determined and the pulses measured by the comparator 14 are then determined at twice the frequency.

Three comparators 14 with resistance circuitry, as illustrated by way of example in FIGS. 1 to 4 for one phase, are preferably needed to detect an interrupted motor phase. An interruption can be detected if the pulses or levels between the three measured phases differ from one another.

The invention claimed is:

1. A method for determining an interrupted motor phase of an electric motor (2) having at least three windings (6) by a control unit (4), the method comprising:
   determining voltages induced in the windings (6) on outer conductors (U, V, W) of the electric motor (2) by at least one measuring unit (14), wherein the measuring unit (14) is connected to at least one outer conductor (U, V, W) of the electric motor (2) via at least one resistor (R),
   comparing induced voltages of the outer conductors (U, V, W) of the electric motor (2) with one another, and
   registering an interrupted motor phase when the induced voltage differs or when a frequency of the induced voltage differs.

2. The method according to claim 1, wherein the electric motor (2) is at least temporarily deactivated or is operated with a reduced current if an interrupted motor phase (U, V, W) is registered.

3. The method according to claim 1, wherein the control unit (4) is in the form of at least one BEMF comparator (14) or in the form of an electric motor controller with at least one BEMF comparator (14), wherein the induced voltage is measured in the form of a signal from the BEMF comparator (14) and the determined signals of the outer conductors (U, V, W) are compared with one another.

4. The method according to claim 1, wherein an interrupted motor phase (U, V, W) is registered if the frequency of the induced voltage is at least doubled in comparison with a reference frequency on at least one outer conductor (U, V, W).

5. The method according to claim 1, wherein an interrupted motor phase (U, V, W) is registered if the frequency of the induced voltage differs from the reference frequency on at least one outer conductor (U, V, W).

6. The method according to claim 1, wherein an interrupted motor phase (U, V, W) is registered if no induced voltage can be measured on at least one outer conductor U, V, W).

7. The method according to claim 1, wherein the electric motor (2) is an electric motor (2) of an engine cooling system.

8. A control unit (4), wherein the control unit (4) is configured to carry out the method according to claim 1.

9. The control unit according to claim 8, wherein the control unit (4) is a comparator (14) or a measuring unit of an electric motor controller.

10. The control unit according to claim 8, wherein the control unit (4) is a comparator (14) or a measuring unit of a pulse width modulator.

11. A non-transitory machine-readable storage medium (16) having a computer program comprising instructions which, when the computer program is executed by a computer or a control unit (2), cause the latter to carry out a method (1) according to claim 1.

* * * * *